US010785172B2

(12) United States Patent
Cherifi et al.

(10) Patent No.: US 10,785,172 B2
(45) Date of Patent: Sep. 22, 2020

(54) METHOD AND APPARATUS FOR DELIVERING MESSAGES BASED ON USER ACTIVITY STATUS

(71) Applicant: Verizon Patent and Licensing Inc., Arlington, VA (US)

(72) Inventors: Tanya D. Cherifi, Basking Ridge, NJ (US); Ramesh Marimuthu, Edison, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 417 days.

(21) Appl. No.: 14/286,578

(22) Filed: May 23, 2014

(65) Prior Publication Data
US 2015/0341290 A1  Nov. 26, 2015

(51) Int. Cl.
G06F 15/16 (2006.01)
H04L 12/58 (2006.01)
H04L 29/08 (2006.01)
H04W 4/12 (2009.01)
H04W 4/16 (2009.01)

(52) U.S. Cl.
CPC ........... *H04L 51/043* (2013.01); *H04L 51/02* (2013.01); *H04L 51/066* (2013.01); *H04L 51/14* (2013.01); *H04L 67/22* (2013.01); *H04W 4/12* (2013.01); *H04W 4/16* (2013.01)

(58) Field of Classification Search
CPC .................................................. H04L 12/5855
USPC .......................................................... 709/206
See application file for complete search history.

(56) References Cited

U.S. PATENT DOCUMENTS

| 7,631,079 | B1* | 12/2009 | Bowman | H04L 12/5875 |
| | | | | 709/223 |
| 8,909,700 | B2* | 12/2014 | Agrawal | H04L 12/581 |
| | | | | 370/457 |
| 2003/0120805 | A1* | 6/2003 | Couts | H04L 51/14 |
| | | | | 709/238 |
| 2005/0038862 | A1* | 2/2005 | Keohane | G06Q 10/107 |
| | | | | 709/207 |
| 2005/0149620 | A1* | 7/2005 | Kirkland | G06Q 10/10 |
| | | | | 709/207 |
| 2007/0064899 | A1* | 3/2007 | Boss | H04L 51/04 |
| | | | | 379/201.01 |
| 2007/0143472 | A1* | 6/2007 | Clark | H04L 12/2602 |
| | | | | 709/224 |
| 2011/0105097 | A1* | 5/2011 | Tadayon | H04W 4/021 |
| | | | | 455/418 |
| 2011/0238767 | A1* | 9/2011 | Murphy | H04L 12/585 |
| | | | | 709/206 |
| 2013/0072172 | A1* | 3/2013 | Chang | G06Q 10/10 |
| | | | | 455/417 |

(Continued)

*Primary Examiner* — Kevin T Bates
*Assistant Examiner* — Clarence D McCray

(57) ABSTRACT

An approach is provided for delivering messages to a user based on their activity status. An activity detection platform receives a request to deliver a message from a sending device to a receiving device. The activity detection platform also detects an activity status of a receiving user associated with the receiving device based on the request. The activity detection platform also presents at least one delivery option for the message at the sending device to a sending user based on the detection. The message is then processed based on the at least one delivery option selected by the sending user prior to a presentation of the message to the receiving user.

20 Claims, 15 Drawing Sheets

(56) References Cited

U.S. PATENT DOCUMENTS

| | | | |
|---|---|---|---|
| 2013/0073985 A1* | 3/2013 | Hamlin | G06F 3/0481 715/753 |
| 2014/0049360 A1* | 2/2014 | Hulusi | G07C 9/00103 340/5.6 |
| 2014/0082098 A1* | 3/2014 | Collins | G06Q 10/109 709/206 |
| 2014/0141818 A1* | 5/2014 | Yoakum | H04L 51/26 455/466 |
| 2014/0214973 A1* | 7/2014 | DeLuca | H04L 51/26 709/206 |

* cited by examiner

100

320

316

400

400

418

418

418

432

400

METHOD AND APPARATUS FOR DELIVERING MESSAGES BASED ON USER ACTIVITY STATUS

BACKGROUND

Service providers and device manufacturers (e.g., wireless, cellular, etc.) are continually challenged to deliver value and convenience to consumers by, for example, providing compelling network services. One area of interest has been the development of location-based services for improving the navigation experience of device users. For instance, many device users are more prone to accidents when attempting to interact with their mobile device while driving. This is especially true when users receive and read text messages while they drive. Unfortunately, there is currently no convenient means of informing the sender of a message that the user is driving or engaged in some other activity that may require their full attention. Moreover, there is no safe, convenient means of conveying the message to the user based on their current activity status.

Based on the foregoing, there is a need for an approach for delivering messages to a user based on their activity status.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF SOME EMBODIMENTS

An apparatus, method and software for delivering messages to a user based on their activity status is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
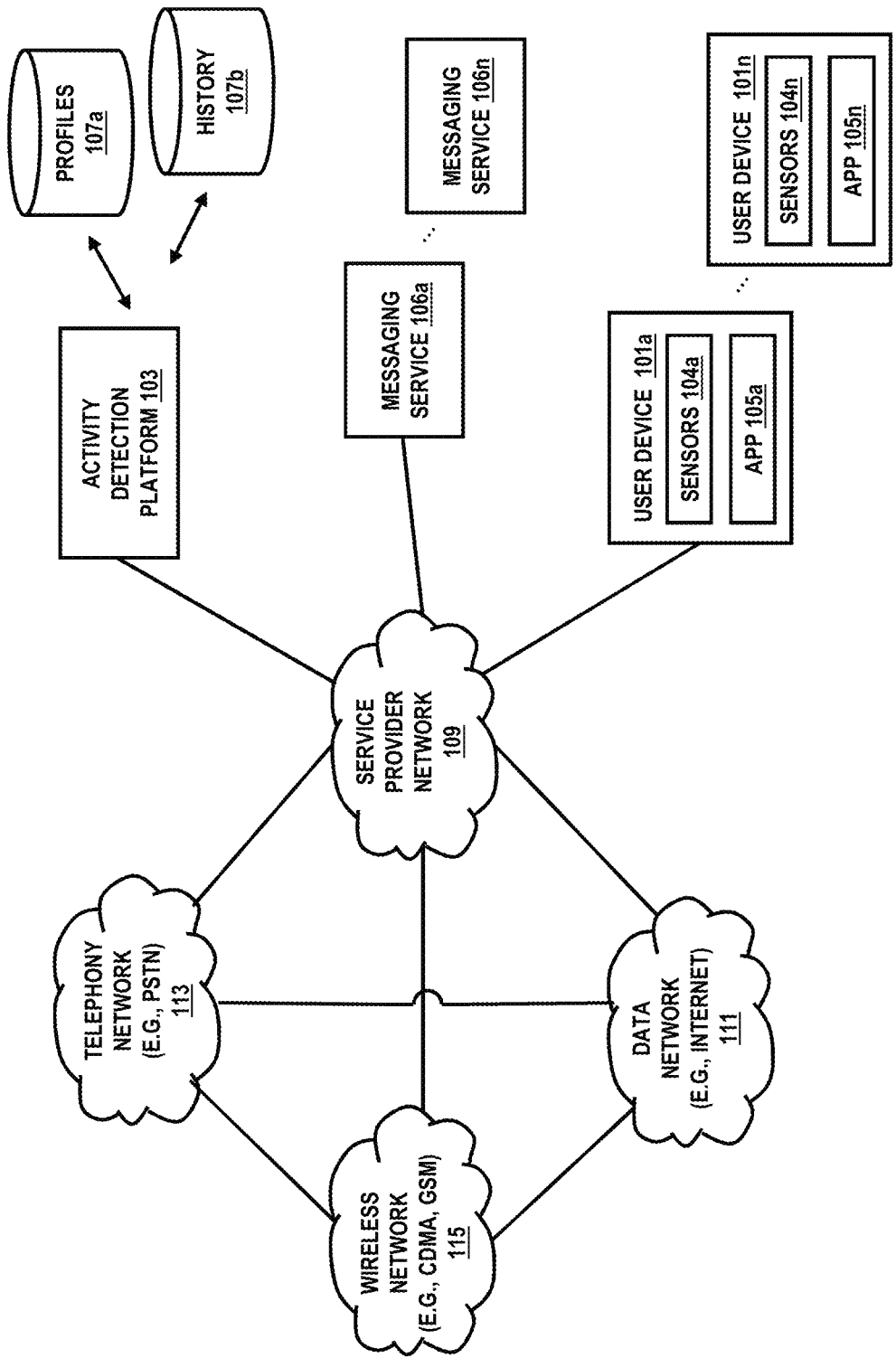
FIG. 1 is a diagram of a system for delivering messages to a user based on their activity status, according to one embodiment.

FIG. 1 is a diagram of a system for delivering messages to a user based on their activity status, according to one embodiment. For the purpose of illustration herein, the message may include any information generated pursuant to an interaction, a session or communication channel that is to be presented and/or rendered by a user device. Also, the activity status as associated with a message may refer to any information for indicating the current level, activity type or nature of a given action being performed by a user during the interaction. This may include, for example, information for indicating the user is currently driving, exercising, engaged in a meeting, interacting with another user, executing a specific device or application task, etc.

It is well known today that certain activities are best performed when a user of a mobile device is not preoccupied with or interacting with their device. For example, statistics show drivers are more prone to have accidents or drive erratically when they attempt to use their mobile device at the same time. This is especially true when users receive and subsequently read text messages, emails, or other communications they receive from others while they drive. Unfortunately, there is currently no convenient means of informing the sender of the message that the user is driving or engaged in some other activity that requires their full attention. Moreover, there is no safe, convenient means of conveying the message to the user based on their current activity status To address this problem, system 100 of FIG. 1 enables users of devices, i.e., user devices 101a-101n, to determine a current activity status of a user they wish to send a communication or message to. In addition, the system 100 enables the sender to select various options for delivering the message based on the activity status, criteria specified by the intended recipient of the message, or a combination thereof. The system 100 ensures the activity status of a sender or recipient of a message is accounted for when facilitating a communication between respective users. It is noted that user devices 101a-101n, referred to herein collectively as user devices 101, may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof.

It is also contemplated that the user devices 101 can support any type of interface for supporting the presentment or exchange of data. As will be discussed further later herein, this may include the rendering and/or presentment of visual, audible or textual information for indicating a current activity status of an intended recipient of a message, a current activity status of the sender of the message, or a combination thereof. In addition, user devices 101 may facilitate various input means for receiving and generating information, including touch screen capability, keyboard and keypad data entry, voice-based input mechanisms and the like. Any known and future implementations of user devices 101 are applicable.

In one embodiment, an activity detection platform 103 is configured to interact with the user devices 101 for presenting activity status information to users with respect to a communication session. As such, the activity detection platform 103 enables a message to be conveyed based on, and with respect to, the activity status of the user intended to receive the message. By way of example, the platform 103 may interact with one or more applications 105 of the user device 101, such as a text messaging application, email application, networking application, event or user driven application (e.g., games, navigation, calendar) or any application for enabling device-to-device interaction. It is noted the activity detection platform 103 may enable the presenting of the activity status in connection with the applications 105 by way of one or more application programming interface (API) executions.

In one embodiment, the activity detection platform 103 receives a request for delivery of a message to a recipient device. The request may be received in response to the launching of a communication application 105 at a given user device, the selection of contact information corresponding to the intended recipient, the establishing of a communication session between a sender and a recipient, the identifying of a communication channel for transmission of the message, the generating of the message, etc. By way of example, in the case where the sender generates a text message via a text messaging application 105 of user device 101a, the platform 103 may receive the request in response to generation of the message by the sender. As another example, the platform 103 may receive a request in response to selection of a recipient to send the message to from a contact list associated with the text messaging application 105.

In one embodiment, once the request to deliver a message is received or otherwise determined, the platform 103 then detects the activity status of the intended recipient of the message. Hence, the platform 103 verifies the driving status of the recipient prior to transmission and/or presentation of the message to the recipient device 101n. By way of example, the driving status may be determined based on the processing/analysis of contextual information gathered by one or more sensors 104 of the user device, including speed information, location information, proximity information, motion information, position information, temporal information, or the like.

The sensors 104 may also detect local or transient network and/or wireless signals, such as those transmitted by neighboring devices during walking of a user or driving of a vehicle to a destination. This may include, for example, network routers as configured within a premise (e.g., home or business), another user device 101 or an intelligent/communicable traffic system (e.g., traffic lights, traffic cameras, traffic signals, digital signage). It is further noted, in certain implementations, that the sensors of a vehicle may be identical to, or configured to interact with, sensors 104 of a user device 101 for enabling data exchange and interaction. The exchange may be facilitated by way of any known or still developing range based or wireless communication protocols.

In addition, other contextual information may also be determined by way of the different applications 105 of the device without use of the sensors 104, including event or schedule information, device operation information (e.g., run-time usage, power consumption, signal strength), current application usage information (e.g., for indicating the category or function of the application) user or device profile information or the like.

Under this scenario, the platform 103 may detect and subsequently process the contextual information against historical movement pattern data, typical power consumption data, the known event and/or schedule information, or the like to determine the current activity status. This historical data may be maintained in a database 107b as history data by the platform for use in performing analysis. For example, the platform 103 may determine the user is currently driving by analyzing start and stop movement patterns of the user, current positioning/location of the user along a street as opposed to a sidewalk, speed information for indicating the user is exceeding a typical/historical walking or running speed for a duration of time, an active usage of the navigation application, an event entry in a calendar application for indicating the user has a meeting to travel to, etc. Hence, it is noted the platform 103 may be configured to automatically detect the activity status based on the contextual information.

In addition to the above described automated detection approach, the activity detection platform 103 may also be configured to prompt the user (the intended recipient) for input regarding their current activity status. Thus, the recipient may manually provide their activity status in advance of the message being delivered or presented (e.g., during an initial configuration period). Alternatively, the prompt may occur in response to receipt of the request for delivery of the message by the sender, i.e., during messaging application launch. By way of example, when movement is first detected via the sensors (e.g., per global positioning sensor tracking), the platform 103 may cause the application 105 of a user device of the intended recipient to present a message for the user to specify their activity status. Under this scenario, a message may be presented that reads "We detect motion. Are you currently: Driving? Running'? Walking'? Exercising? Please select one." Along with the message, one or more user input buttons may be presented for receiving input for indicating a selection, i.e., "Exercising." Alternatively, an input button may be presented for indicating the user is currently a passenger in a vehicle but not driving. It is noted that the prompt may be presented visually, textually or audibly (e.g., as a voice based prompt) at the discretion of the user.

In one embodiment, the platform 103 may also enable user definition of a new activity to associate with the detected motion. By way of example, the user may specify a different or custom activity status to be presented subsequently by the platform 103, i.e., "Dancing" or "Biking," in response to the determined movement of the user. It is noted the user defined activity may be stored in a profile database 107a maintained for the user by the platform 103. Under this approach, users may refine the activity status detection capabilities of the platform 103 commensurate with the types of activities they wish to specify—i.e., those activities wherein they wish to be uninterrupted. Furthermore, over time, the platform 103 may learn which activity status types to present with respect to a user based on the compilation of contextual information, user defined activity status types, etc.

It is noted, therefore, that the activity detection platform 103 may enable various means of determining the activity status of an intended recipient, including contextual information processing and manual input processing. In one embodiment, the platform 103 may also process the contextual information associated with other users or devices 101 within a range of the intended recipient to deduce an activity status of the intended recipient. For example, in the case where the intended recipient is travelling with a group of device users in the same vehicle, the platform 103 may determine the recipient is the driver by analyzing one or more of: the close proximity of the devices 101; input provided by the other users for indicating they are passengers; sensor information provided by various sensors of the vehicle (e.g., for indicating the number of passengers in the vehicle); the close match/exactness of the speed, location, position and movement information of the users and the intended recipient; information for indicating commonality of the users (e.g., social networking affinity information), etc. As another example, the driving status of a user may be determined automatically in response to the pairing of their user device with a network enabled or sensor based system of the user's vehicle.

For privacy reasons, the intended recipient may opt out of sharing of their activity status. By way of example, in the case where the user of the recipient device is driving, the user may not wish to publish this status to others. As such, the user may deactivate the sharing of their activity status by the platform 103 by way of a provided input—i.e., a checkbox or button—for specifying this choice. This activation and/or deactivation process may be performed via a user interface of the application 105 at the discretion of the user.

In one embodiment, the activity detection platform 103 persistently or periodically monitors the activity status to determine changes in the status of the recipient. For example, in the case where a user specifies they are driving, the platform 103 is configured to manage incoming messages (those to be delivered from a sending device) based on this status. However, subsequent sensor information may be processed to determine deviations in the motion, speed, movement patterns, etc. When a deviation is detected, the platform 103 may then initiate a prompting of the user to update their activity status, i.e., "Your movement has changed? Are you still driving?" Furthermore, incoming message may be managed differently by the platform 103 based on determined changes in activity status.

In one embodiment, the activity detection platform 103 enables users to specify criteria to be fulfilled for defining how messages are to be managed upon delivery to the recipient device based on the determined activity status of the recipient. The criteria may be stored in connection with a profile of the user as maintained via the profile database 107a. In addition, the criteria may specify various conditions, parameters and message delivery preferences for indicating the manner of presentment and/or delivery of messages to the recipient. By way of example, the criteria may specify one or more of the following message delivery preferences be performed by the platform 103 with respect to the sending device, per Table 1 below:

TABLE 1

Send the message regardless of the determined activity status
Display the message regardless of the determined activity status
Transmit an automatic reply message that also indicates the current activity status
Convert the message from its original format to another—i.e., automatically use text-to-voice conversion for conveying a text message, email, etc., delivered to a recipient as an audible message; this may correspond to a transcription of the original message
Convert to voicemail—i.e., automatically convert a text message, email, etc., into an audible message to be sent to voice mail of the recipient
Convert to voice call—i.e., automatically connect the receiver over a voice call. Per this option, the voicemail system may be invoked when the voice call is not answered or the application was configured in advance to redirect voice calls to voicemail during driving/busy activity status.
Delay the message until movement stops—i.e., opt to receive text messages only after the vehicle stops
Delay the message until pairing stops—i.e., opt to receive messages only after the user device is no longer paired with a network or sensor based system of the vehicle
Present via the vehicle display system—i.e., display the message on vehicle's head-end screen
Redirect the message—i.e., redirect the call to another user within close proximity of the user
Do nothing—i.e., block the message from being delivered In one embodiment, the recipient may also assign a priority to the different message delivery preferences. The priority may enable the user to indicate a level of importance or preference of one message delivery preference option versus another. For example, the user may assign the option of delaying the message until the vehicle stops as a top priority, while presenting the message and redirecting the message are the second and third priorities respectively. Alternatively, a default message delivery preference (priority) may be established by the user or the platform 103 for instances where the user does not define a preference. The prioritization, when processed in accordance with one or more established conditions, enables the user to further customize the platform 103 for responding to incoming messages from senders.

In one embodiment, the user may further establish conditions to fit their unique message delivery preferences. For example, a condition may be established for indicating the activity status of a user is not to be indicated during a particular time of day. Under this scenario, a user can "turn on" their driving status weekdays between 7 and 8 am and again between 5 and 6 pm, because they are aware they will be driving to and from work during these time frames. As another example, a condition may be specified to indicate specific content be presented for indicating the activity status. Under this scenario, when it is determined the user is exercising based on their current location at a gymnasium, motion information, etc., the activity status may be presented as a picture, a logo or as a custom message that reads "Busy working my muscles!" Alternatively, various default messages such as "Busy" or "Unavailable" may also be presented. Still further, the conditional settings may be activated on a scheduled basis, i.e., to occur throughout the year, bi-weekly, on a specific date, at a specific time, etc.

In the case where the user establishes criteria for indicating messages are to be redirected, the redirection may occur based on established permissions by the intended recipient as well as the permission of the other users. For example, the intended recipient may specify, per their profile, the identifiers of those devices and/or users they wish to have messages redirected to along with conditions for redirection. An exemplary condition may include a specification that incoming messages from a first sender be directed to a first user while those from a second sender be directed to a third user. Another condition may include redirecting the message to a group of users at a specific time of day while converting the message to voicemail at a different time of day.

In the case where the user establishes criteria for redirecting voice calls to voicemail, the criteria may include detecting the user has an active driving status based, for example, on a user specified input for indicating their current driving status or fulfillment of a predetermined temporal condition, voice calls are automatically redirected to a designated voicemail system. The calls may be placed on the missed call log of the user device 101 and flagged as being redirected. Per this setup, the incoming call does not cause the phone to ring or enable the call to be placed as a voice call when his activity status is driving or busy.

It is noted that the users may or may not employ devices 101 configured to interact with the activity detection platform 103. In the case where a sending device is not configured to interact with the platform 103 directly, the sender may at least receive a message from the platform 103 on behalf of the recipient device that is configured. For example, the recipient device may send an auto response text message to the sender that reads "The receiver is currently driving. Your text message will be delivered once the recipient stops driving." Under this scenario, the sending device is still presented with information for indicating the activity status of the user. Alternatively, a different type of message may be conveyed to the user as well depending on the criteria established by the recipient.

In the case where the devices are configured to interact with the platform 103, the users may indicate their permission to receive redirected messages on behalf of the intended recipient. This may also be established by way of an initial presence detection means, wherein upon entry of multiple users into a vehicle or to within a close range x of each another, the platform 103 prompts each user device 101 to establish their messaging permissions. Under this scenario, the message may read as "Tim's Phone, Phone ABC and Craig's Phone have been detected. Do you want to give them messaging permissions?" Along with the message, the user may be presented with input selection buttons for indicating which user's they wish to give permission to. Alternatively, the above described procedure may be invoked manually by at least one of the respective users via the application 105.

Once the criterion is established, it is stored in association with the profile of the user (the intended recipient). Having defined the message delivery preferences and associated conditions, the platform 103 is able of displaying, upon request, the activity status of the user along with one or more message delivery options for delivering a message based on that status. In one embodiment, the activity detection platform 103 presents the delivery options to the sender based on the preferences configured by the recipient per Table 1 above. Thus, only those preferences selected by the recipient per their user profile are presented to the display of the sender. By way of example, when the intended recipient specifies their preferred action is to have messages redirected to an alternate user and/or to have the message converted to voicemail, these are the only delivery options presented to the sender.

In one embodiment, the activity detection platform 103 may be configured to execute one or more safety or operational procedures based on the activity status of the user of a device 101. The safety or operational procedures may include one or more preventative measures, parental controls or the like. By way of example, a parent may configure the platform 103 to prohibit the messaging capabilities of a mobile device based on the determined activity status of their child. Under this scenario, when it is determined the child is driving, the platform 103 may be configured to prevent the sending of text messages until after the driving status changes. In another scenario, the platform 103 may be configured to automatically convert text messages delivered to the child during their study time (e.g., from 4 to 6 pm) to voicemail. In either case, the platform 103 may present a warning message to the child to inform them of the control measure, one or more rules to be performed by the child, etc.

As another example, the platform 103 may be configured to override current established messaging preferences of an intended recipient of a message or of the sender based on their respective activity statuses. Per this scenario, when it is determined the user is driving in an area historically known to have rugged terrain, high accident rates, obstructions, etc., the platform 103 may prevent the delivery or sending of text messages or emails during active driving. In another scenario, when it is determined the user is driving during rainy weather, the platform 103 may automatically be caused to redirect all incoming text messages to another user. Still further, when it is determined the a sender is no longer a passenger but currently the driver of a vehicle, the text messaging capability of the device may be restricted or delivery of the messages may be delayed until after the user has stopped. It is noted, in each of these scenarios, that the platform 103 may rely upon contextual information, historical data, sensor data, or a combination thereof for detecting fulfillment of a hazard or safety condition.

For the purpose of illustration, an exemplary use case of a first user (User 1) of a device 101a attempting to send a text message to a second user (User 2) of a user device 101n is presented. In this scenario, both user devices 101a and 101n are configured to interface with the activity detection platform 103. Alternatively, only one of the user devices may be configured to interact with the platform 103—i.e., it is not able to specify preferred message delivery options. Also, per this example, user device 101a facilitates communication via a first messaging server 106a while user device 101n facilitates communication via a second messaging server 106b. It is noted the platform 103 may facilitate the exchange of information for indicating the activity status of users regardless of the messaging service employed by respective user devices 101a and 101n, the application 105a and 105b configurations of the devices, the accessibility of the devices to the platform 103, or a combination thereof.

Per this scenario, when User 1 opens their text messaging application, the messaging service 106a authenticates the user's activity status per the activity detection platform 103. This may include, for example, processing contextual information regarding the user of the device 101a as well as prompting the user for input to indicate their current activity status. When User 1 is determined to be driving, the platform 103 causes the texting application to present various messaging options based on their criteria. This may include an option to ignore the driving status, to block the user from texting while driving or to present the user with safety warnings when they attempt to use the messaging application during driving (e.g., "It is dangerous to text while driving.").

In the case where User 1 selects User 2 to be the recipient of a text message, the platform 103 interacts with the messaging service 106a to check the driving status of User 2. In response, the platform 103 determines the request to deliver the message for and triggers detecting of the activity status of the User 2. This may include, for example, processing contextual information, sensor data, user input, or the like related to the user. In the case where User 2 is determined to be driving, the texting application at the first user device 101a prompts User 1 to choose alternative options for sending the message per the criteria settings established by User 2. This includes sending an audible version of the text message to User 2. Alternatively, in the case where User 1 ignores the alternative message delivery options presented, the messaging service 106a transmits the message to messaging service 106b along with a data tag for indicating the driving status of the User 2. As such, the message is sent in conjunction with data for conveying the current activity status.

When the messaging service 106b of User 2 receives the message from messaging service 106a, with or without the driving status tag, the platform 103 causes the service to check the activity status of User 2. If User 2 is found to be driving, the messaging service operates in connection with the platform 103 to determine the established message delivery preferences for User 2. In the case where User 2 is blocked from receiving texts while driving, the platform 103 initiates an instruction for the messaging service 106b to hold the message until User 2 becomes static (not driving). In the case, however, where User 2 has opted to ignore the driving status, the text message is transmitted immediately. It is noted that this process is repeated when User 2 attempts to send a text to text User 1.

In one embodiment, the activity detection platform 103 maintains a record of a user's activity status and changes thereof. For example, the platform 103 may record the date, the time and number of occurrences of a user sending or receiving a message during a particular activity (e.g., driving). In addition, the record may indicate the most common senders of messages, the typical time of delivery of messages from the sender, instances where the user was the sender of a text that was tagged as the recipient driving, etc. Based on this information, the platform 103 may enable individual users to generate activity reports, safety reports, or the like. The reports may be further shared with third party service providers associated with the users, such as an insurance company, for providing useful metrics regarding the user's driving activity. Under this scenario, the data may be used to determine discounts, driver incentives and policy configuration changes or updates required for the user based on their driving habits.

In addition to individual records, the data may be aggregated for a number of users of the platform 103 and stored as historical data per database 107b. Based on this data, the platform 103 may further generate group level reports, activity level reports, geographic activity reports, etc. For example, it may be determined that an increase in text messaging activity occurs in a given region versus others at a certain time of day. This data may be subsequently analyzed against traffic pattern information, municipality data, or the like for determining a cause of the increased messaging activity, correlations between the messaging activity and road configuration, road construction, etc.

It is noted that the activity detection platform 103 may be implemented as a cloud based service, hosted platform or the like for exchanging as well as receiving information from the user devices 101, sensors 104, applications 105, messaging services 106 or a combination thereof. Alternatively, the activity detection platform 103 may be directly integrated for processing data generated and/or provided by the user devices 101, sensors 104, applications 105 or messaging services 106. Per this integration or interface, the activity detection platform 103 may readily present and share relevant activity status information in connection with any messaging activity, user collaboration activity, or the like.

In certain embodiments, the user devices 101, the activity detection platform 103, applications 105, messaging services 106 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
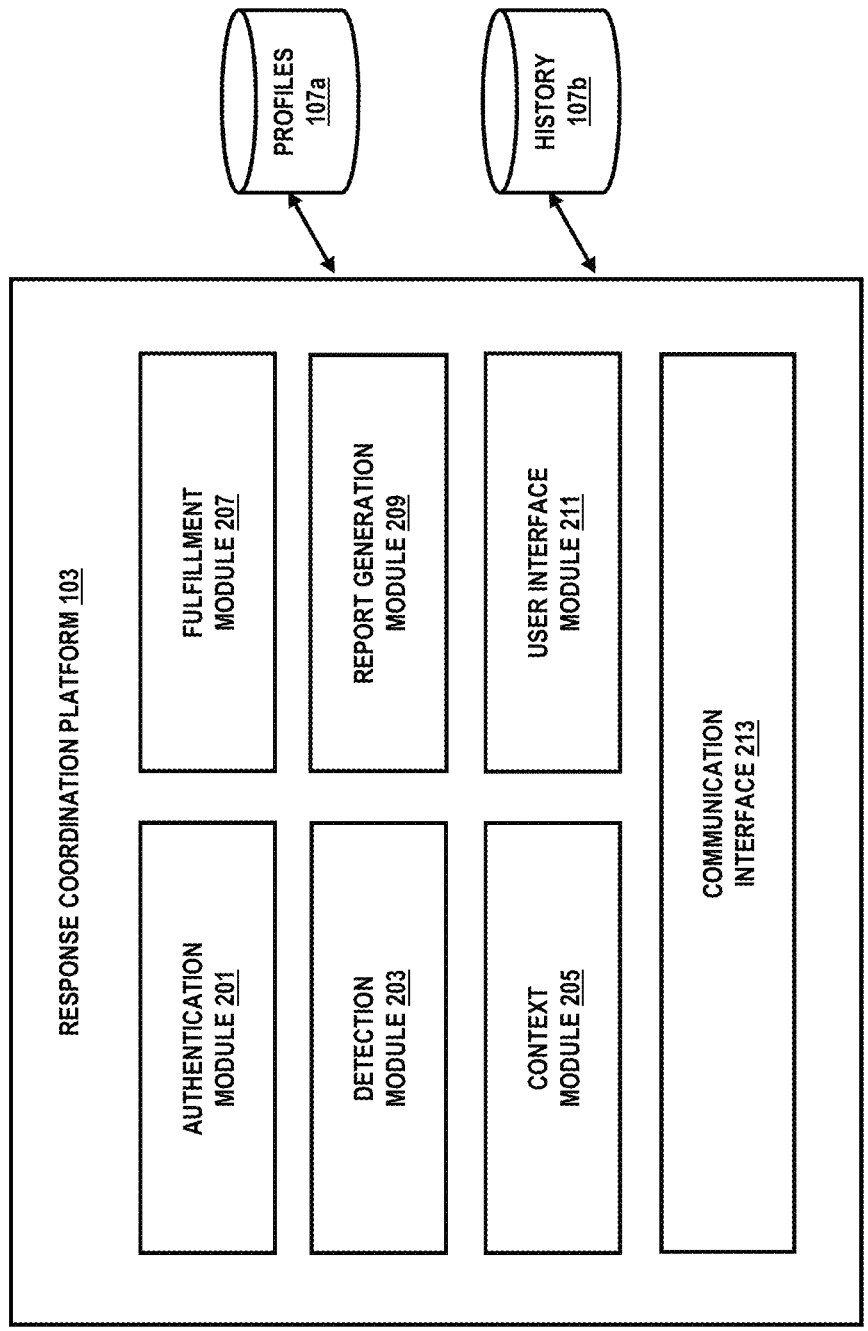
FIG. 2 is a diagram of the components of an activity detection platform, according to one embodiment.
Figures 3A, 3B:
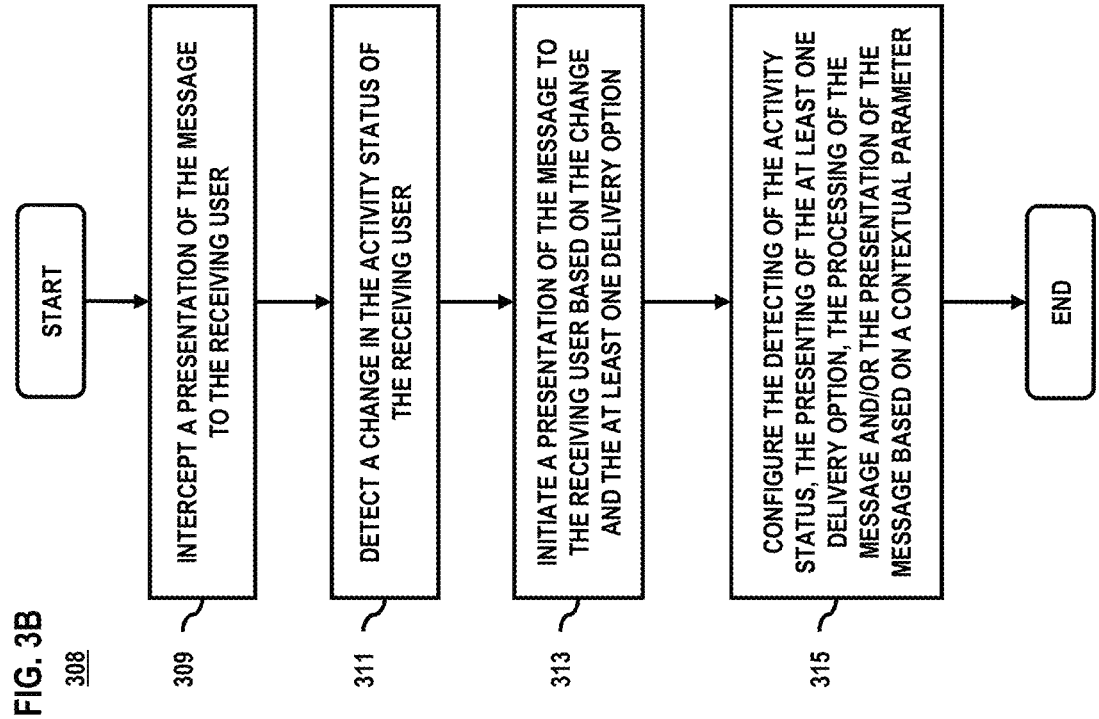
FIGS. 3A-3D are flowcharts of processes for delivering messages to a user based on their activity status, according to various embodiments.
Figure 3D:
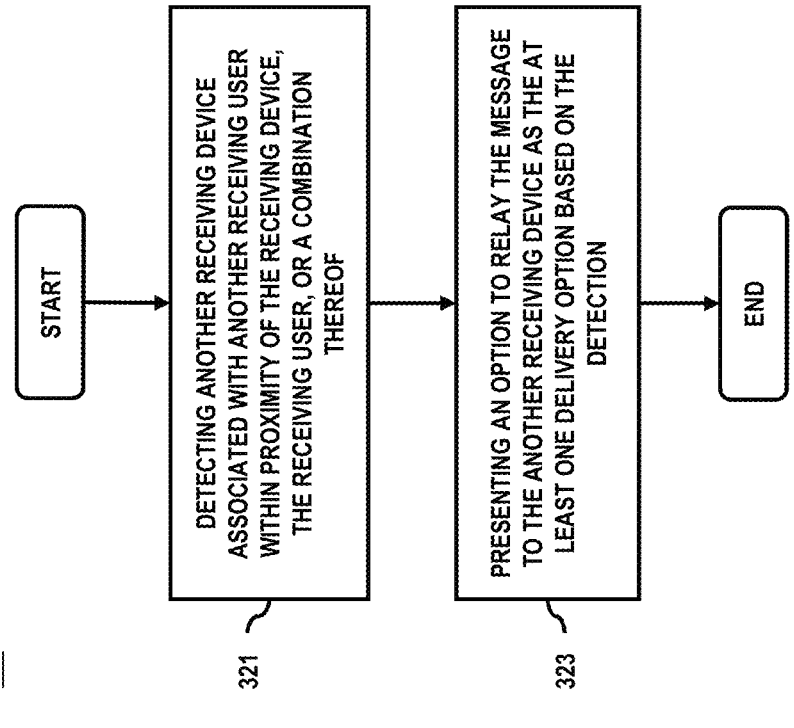
Figure 3C:
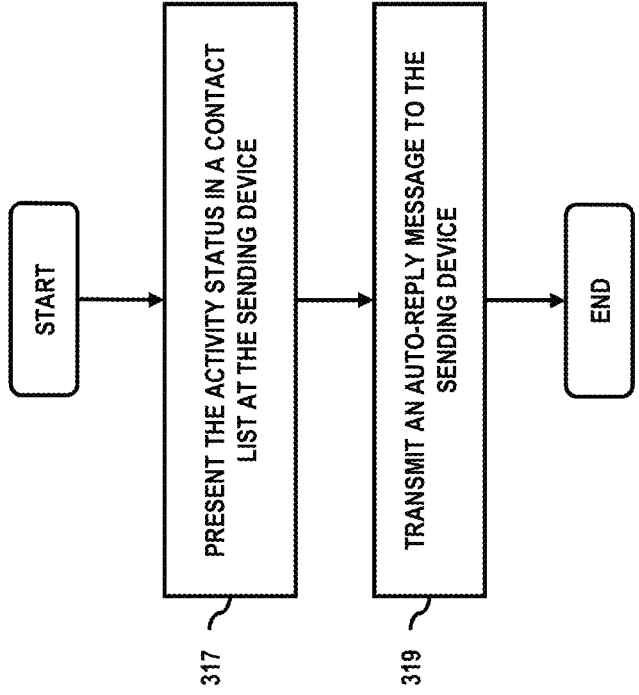

FIG. 2 is a diagram of the components of an activity detection platform, according to one embodiment. By way of example, the activity detection platform 103 includes one or more components for alerting device users engaged in various modes of travel they are creating a bottleneck. It is contemplated that the functions of these components may be combined in one or more components or performed by other components of equivalent functionality. In this embodiment, the activity detection platform 103 includes an authentication module 201, a detection module 203, a context module 205, a fulfillment module 207, a status generation module 209, a user interface module 211 and a user interface module 213.

The authentication module 201 authenticates users and user devices 101 for interaction with the activity detection platform 103. Authentication may occur based, at least in part, on processing of profile information maintained for the user via database 107a. By way of example, the authentication module 201 receives a request to access the activity detection platform 103 via an application 105. The request may be submitted to the authentication module 201 via the communication module 213, which enables an interface to the application 107 and the platform 103. Alternatively, the communication module 213 and user interface module 211 may operate in connection with the authentication module 201 to support execution of various APIs of a navigation application of the user device 101. Per these APIs, for example, the user may access the activity detection platform 103 as a function of the application accordingly.

The detection module 203 may operate in connection with the context module 205 to determine the activity status of a user and/or user device. By way of example, the context module 205 may process contextual information as gathered by the applications 105, the sensors 104, or a combination thereof. The contextual information may include, for example, temporal data, motion data, speed data, location data, environmental data, or the like, all of which may be processed by the detection module 203 against historical/known data for indicating a particular activity status. This historical data may be maintained in a database 107*b* as history data by the platform for use in performing analysis.

In addition, the detection module 203 may interact with the user interface module 211 for processing user input provided for indicating the activity status of the user. By way of example, the user interface module 211 may present the user with various input selection options for indicating they are driving, operating as a passenger, exercising, etc. Once received, the detection module 203 processes the input in connection with any gathered contextual information to determine the activity status to be associated with the user for the moment. The activity status may then be conveyed to the user interface module 211 and/or communication module 213 for enabling sharing of said status with requested user devices. It is further noted that the detection module 203 may also detect changes in activity status of a user based on changes in contextual data, the user input, etc.

The fulfillment module 207 determines, based on criteria specified by the user, whether a condition established by the user for execution of a message delivery preference is fulfilled. In addition, the module 207 determines a prioritization associated with a message delivery preference for enabling customized, priority based execution of message delivery. By way of example, the module 207 may interact with the context module 205 to determine a current time matches a period of time specified by the user in which no text or email communications are to be allowed. This time may be further correlated with a driving activity status of the user and prioritized above other message delivery preferences, such as conversion of the message or redirection of the message. It is noted that the fulfillment module 207 may also operate in connection with the user interface module 211 and communication module 213 to initiate execution of a particular message delivery preference in connection with a messaging service 106 or application 105 accordingly.

The report generation module 209 maintains a record of a user's activity status and changes thereof. In addition, the report generation module may aggregate the data or reports of multiple users for generating the historical information 107*b*. Based on the recorded information, the module 209 may enable individual users to generate activity reports, safety reports, or the like. In addition, the aggregate data may be used to generate group or category based reports for use by third parties (e.g., an insurance company). Still further, the reporting generation module 209 may operate in connection with the fulfillment module 207 and detection module 203 to enable continual learning and refinement of the activity status detection capabilities of the detection module 203.

The user interface module 211 may cause the presentment of messages to the display of the user device 101 in conjunction with the activity status information of a user. The activity information may be presented visually, audibly or textually and may further be presented virtually in the case of an augmented reality display, three-dimensional display system, or the like. Also, the user interface module 211 may enable the rendering of various instructions, graphical elements and the like for presentment to the user interface of an application 105 of display of a user device 101 per one or more application programming interface (API) executions. The user interface module 211 may also operate in connection with the communication module 209 for facilitating the exchange of activity status information via the communication network 105 with respect to the services 109, content providers 115 and applications 105.

The above presented modules and components of the activity detection platform 103 can be implemented in hardware, firmware, software, or a combination thereof. Though depicted as a separate entity in FIG. 1, it is contemplated that the platform 103 may be implemented for direct operation by respective user devices 101. As such, the activity detection platform 103 may generate direct signal inputs by way of the operating system of the user device 101 for interacting with the application 107. In another embodiment, one or more of the modules 201-211 may be implemented for operation by respective user devices as a platform 103, cloud based service, or combination thereof.

Figure 6:
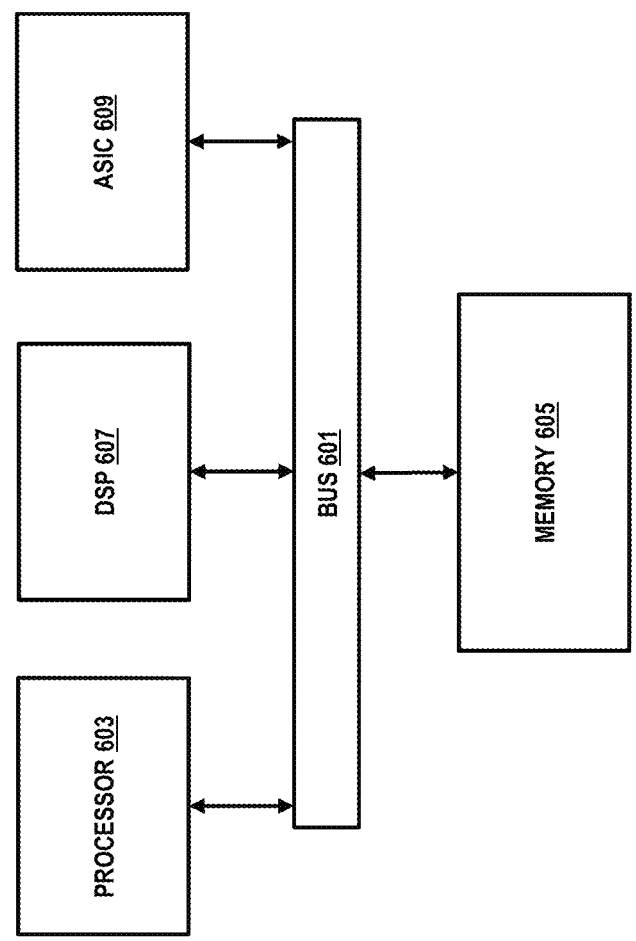
FIG. 6 is a diagram of a chip set that can be used to implement an embodiment of the invention.

FIGS. 3A-3D are flowcharts of processes for delivering messages to a user based on their activity status, according to various embodiments. In one embodiment, the activity detection platform 103 performs processes 300, 308, 316, and 320, and is implemented in, for instance, a chip set including a processor and a memory as shown in FIG. 6.

In step 301 of process 300 (FIG. 3A), the activity detection platform 103 receives a request to deliver a message from a sending device to a receiving device. The request may be established based on the launch of a messaging application, the initiation of a message, selection of an intended recipient from a contact list, or the like. In another step 303, the platform 103 detects an activity status of a receiving user associated with the receiving device based on the request. As noted, the activity status may include a driving status, a busy status, a do not disturb status, a user defined status, or a combination thereof. The user may also define a custom activity status for indicating their activity.

In step 305, the activity detection platform 103 presents at least one delivery option for the message at the sending device to a sending user based on the detection. By way of example, the delivery options may include at least one of: delivering the message unchanged; converting the message to another medium for delivery; initiating another form of communication; and cancelling the message. In another step 307, the platform 103 processes the message based on the at least one delivery option selected by the sending user prior to a presentation of the message to the receiving user.

In step 309 of process 308 (FIG. 3B), the activity detection platform 103 intercepts a presentation of the message to the receiving user. In another step 311, the platform 103 detects a change in the activity status of the receiving user. For example, the platform 103 may process updated contextual information or receive an updated user input for indicating the status to determine the user has gone from a driving status to a walking status. In another step 313, the activity detection platform 103 initiates a presentation of the message to the receiving user based on the change and the at least one delivery option. By way of example, in the case of a change in activity status from driving to no activity, an icon for representing this status may be adapted and presented accordingly.

Per step 315, the platform 103 configures the detecting of the activity status, the presenting of the at least one delivery option, the processing of the message, the presentation of the message, or a combination thereof based on a contextual parameter. By way of example, the contextual parameter may include a temporal parameter, a location parameter, an activity parameter, a user identifier, a device identifier, or a combination thereof. As noted, the platform 103 may persistently monitor the activity status of a device or corresponding user in order to continually convey current/real-time activity status.

In step 317 of process 316 (FIG. 3C), the activity detection platform 317 presents the activity status in a contact list at the sending device. Per this approach, an icon, status message or other information for indicating a current activity status of a user may be presented. The contact list may be associated with a messaging application, a social networking application, a calendar application or the like. It is contemplated that the contact list may also be filtered or searched based on the current activity status as a further means of enhancing the messaging experience.

In step 319, the activity detection platform 103 transmits an auto-reply message to the sending device. The auto-reply message may be configured by the user as one of many message delivery options, and may include custom content specified by the user or default messaging content. Regardless of the content, the auto-reply message indicates the activity status of the receiving user in conjunction with the messaging content. Upon receipt of the response, the sender is aware of that the user is unavailable to respond and can arrange to communicate later.

In step 321 of process 320 (FIG. 3D), the activity detection platform 103 detects another receiving device associated with another receiving user within proximity of the receiving device, the receiving user, or a combination thereof. In another step 323, the platform 103 presents an option to relay the message to the another receiving device as the at least one delivery option based on the detection. As noted previously, this may correspond to a the redirection message delivery option, wherein the user specifies one or more other users of devices they permit to receive the messages on their behalf based on their activity status (e.g., driving status). It is noted the activity status of the alternate recipients of the message may also be accounted for by the platform 103 when initiating the redirect.

FIGS. 4A-4I are diagrams of user interfaces utilized in the processes of FIGS. 3A-3D according to various embodiments. The diagrams depict the mobile devices 400, 418 and 432 of users named Mekail, Alijah and Susan respectively. For the purpose of illustration, Mekail and Susan are travelling together in the same vehicle to a destination, where Mekail is the driver and Susan is the passenger. Alijah, who is not driving or engaged in any other attention consuming activity, attempts to communicate with Mekail while he is driving. It is noted that the devices 400, 418 and 432 are configured for interaction with the activity detection platform 103. Therefore, the activity detection platform 103 is capable of enabling one or more application programming interface executions for rendering messages, activity status information, message delivery selection options and the like in conjunction with the messaging applications of the devices.

Figure 4A:
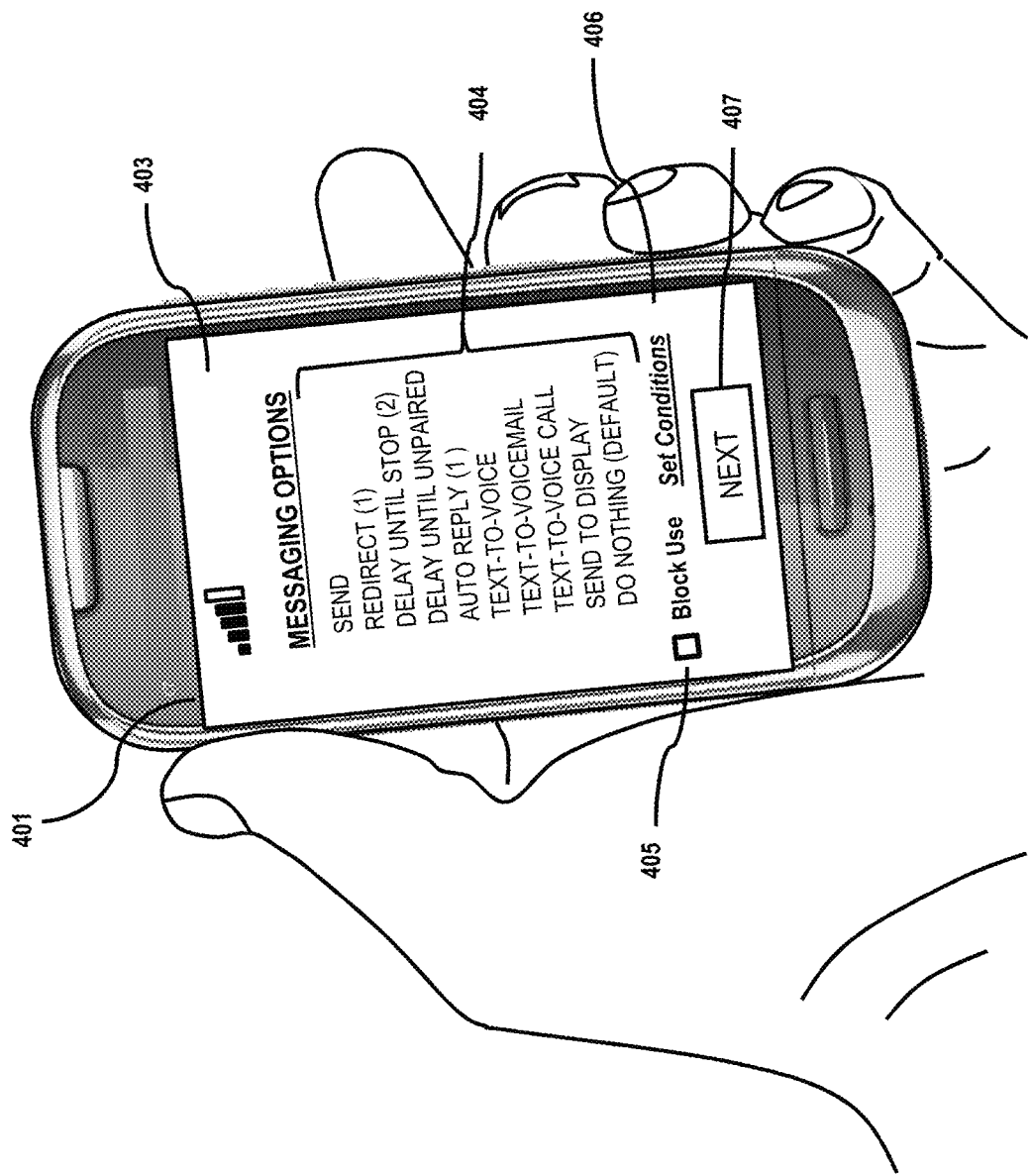
FIGS. 4A-4I are diagrams of user interfaces utilized in the processes of FIGS. 3A-3D according to various embodiments.

In FIG. 4A, device 400 presents a configuration interface 403 of the platform 103 to the display 401, which Mekail accesses prior to driving his vehicle. The configuration interface may be launched, for example, via a user interface of the platform directly. Alternatively, the configuration interface may be launched per a settings feature of a messaging application (e.g., Mekail's favorite short message service (SMS)) application. Per the interface 403, the user is presented with multiple message delivery preference options 404 for establishing how incoming messages are managed based on the determined activity status of the user. Also presented to the display is a "Block Use" checkbox selection option for activating and/or deactivating the execution of messaging applications (e.g., texting) during certain activities. When checked, the platform 103 operates in connection with the device to prevent the use of messaging applications.

Also presented is a "Set Conditions" link 407 for enabling the user to specify various conditions, criteria and/or parameters to be met for invoking a selected messaging option. While not shown, selection of link 407 may cause the presentment of various condition settings options. The conditional settings may include, for example, a time setting for execution of a particular delivery option 405, an activity status condition, an environmental condition, a default messaging option, etc. Other conditions may be established with respect geographic and/or location conditions, weather conditions, etc. In addition, the user may schedule certain conditions to be applied on a recurring and/or periodic basis in connection with a calendar application. It is noted that the platform 103 may accommodate various combinations of conditions for accommodating the preferences of the user.

Mekail selects three message delivery preferences from the list of options 405 and assigns each a priority. He also activates checkbox 405 and specifies the condition that the delivery preferences are to be performed with respect to driving activity on an ongoing basis. In this case, the highest priority is redirection, wherein incoming messages are intercepted and subsequently delivered to an alternate recipient of the message. Also tied for highest priority is auto-reply, wherein a default or custom response message is delivered to the sender. The second highest priority option chosen is delay until stop, which enables an incoming message to be delivered only after the specified activity status (e.g., driving status) has ceased. Under this scenario, where multiple first priority selections are made, the platform 103 executes both of these options. Alternatively, the user may segregate the selections into priorities 1-3 or specify additional selections and/or priorities accordingly. Mekail then selects the NEXT action button 407 to continue configuring the messaging options.

Figure 4B:
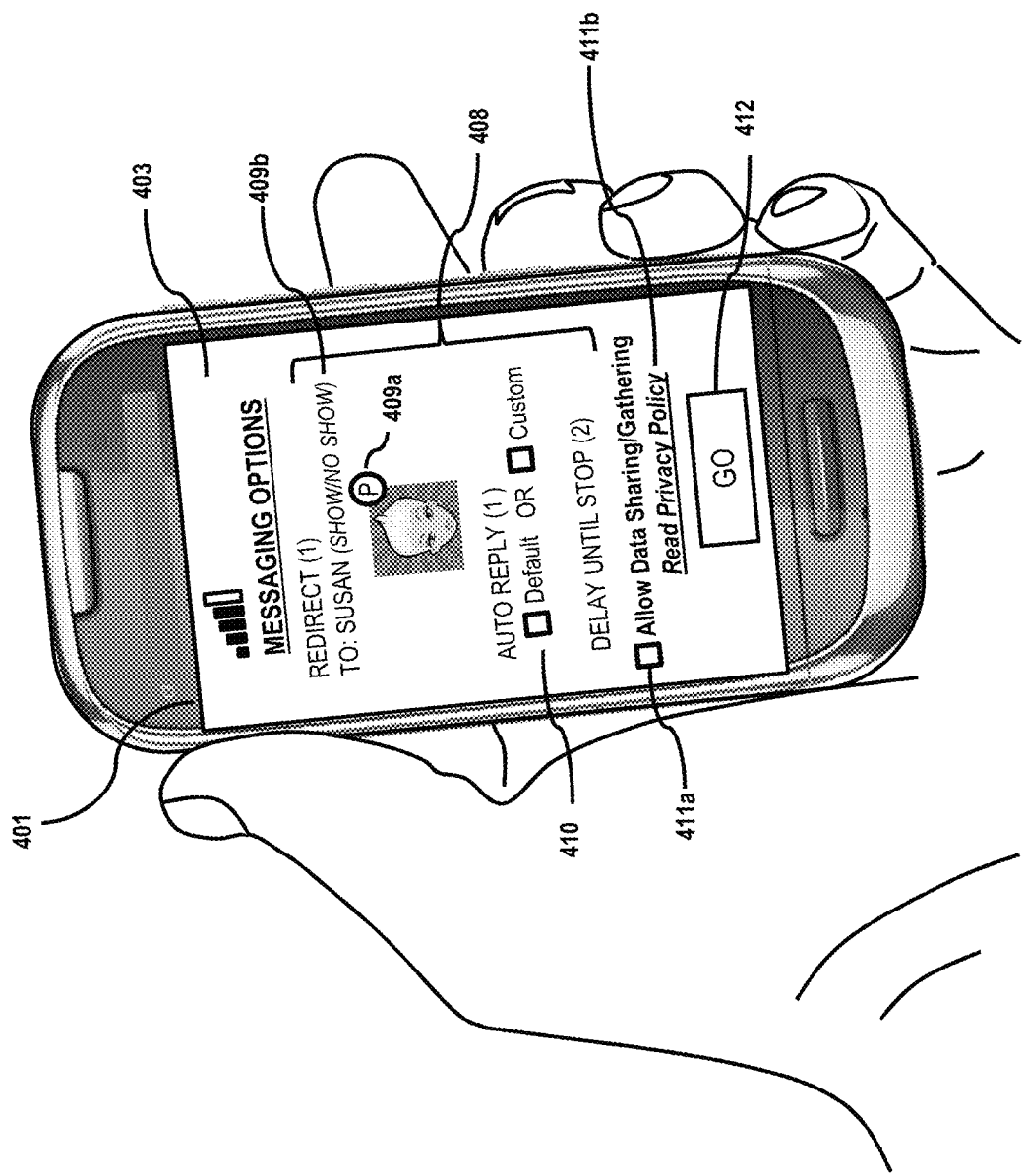

In FIG. 4B, additional selection options are presented to the user for further establishing their message delivery preferences and completing the configuration. By way of example, the user is given an option to specify the alternate user they want to direct messages to while they are driving, which in this case is Susan. As the user selects Susan from the contact list, an icon 409b is presented in connection with her contact data for indicating she has a current passenger activity status—i.e., Susan indicated her status prior to Mekail selecting her as an alternate recipient. Alternatively, the platform 103 may detect Susan's close proximity and initiate a prompt for Mekail and Susan to specify their current activity status of driver and passenger respectively.

Having chosen the auto-reply option, the interface presents checkbox selection options (e.g., checkbox 410) for enabling the user to specify whether they want a default message or custom response message to be delivered to a sender. In this scenario, the user selects the default option. In addition, the user selects a checkbox 411a for indicating they give permission to share their activity status with the platform and with other users. Selection of the checkbox 411a also indicates the user's permission to gather and store sensor data, historical data regarding the user, etc. A "Read Privacy Policy" link 411b may also be presented for selection for indicating terms of use of the collected and/or shared data. The user then selects the GO action button 412 to invoke the configuration settings. It is noted that the settings may correspond to the criteria of the user and maintained in association with a profile of the user accordingly by the activity detection platform 103.

Figure 4C:
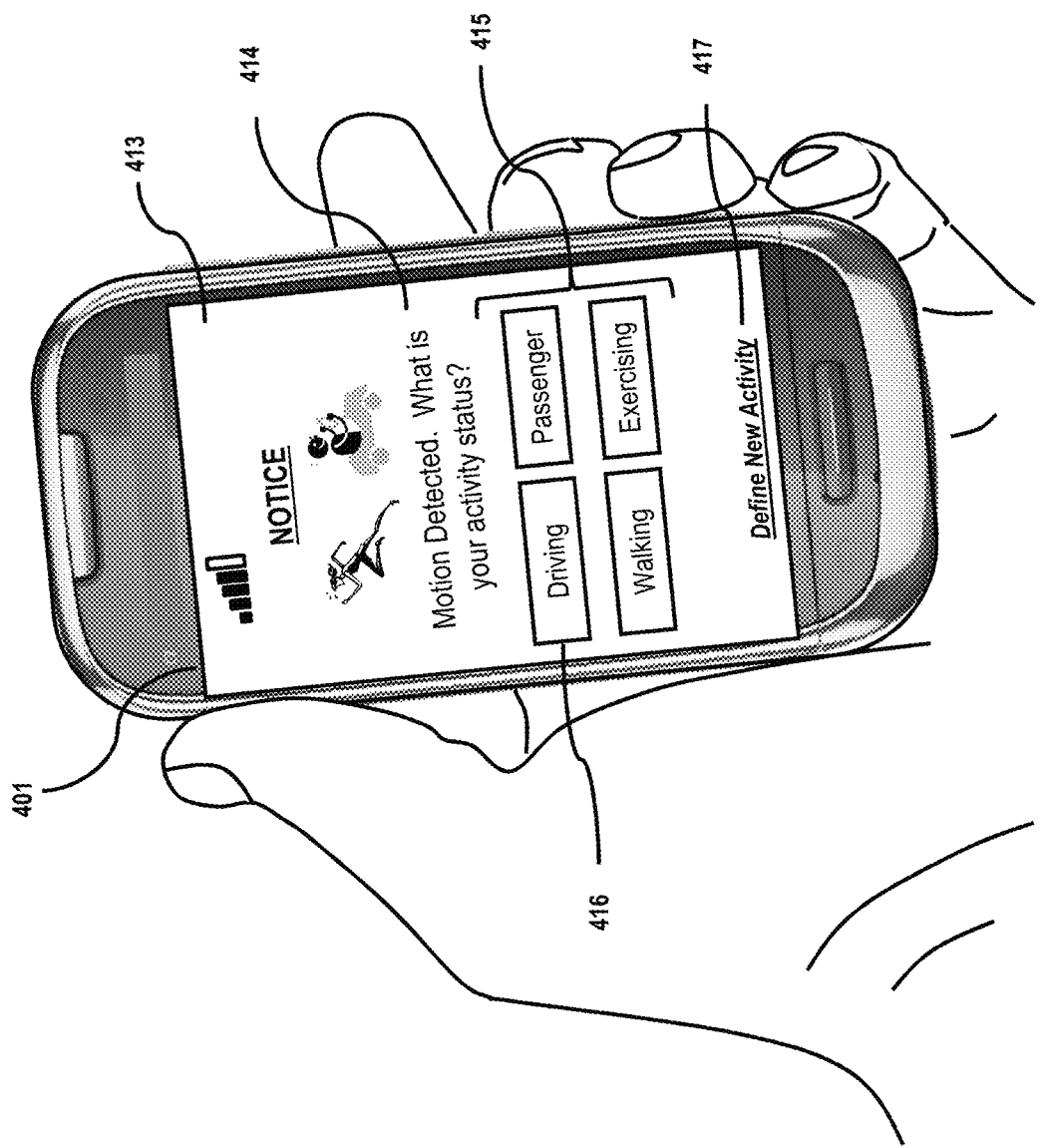

In FIG. 4C, as Mekail begins driving, the sensors of his device 400 detect a change in position, motion and speed. Resultantly, the activity detection platform 103 initiates presentment of a notification message 413 to the display 401 for requesting input regarding the user's activity status. In addition to inquiring about the user's current activity via inquiry content 414, four action buttons 415 are presented for acquiring the user input. In this case, Mekail selects the Driving action button 416 for specifying their current driving activity status. While not shown herein, the user may also select the "Define New Activity" link to invoke a separate interface for establishing a new activity status. It is noted, therefore, that the platform 103 may support the defining of multiple activity statuses in conjunction with different conditional execution scenarios at the discretion of the user.

Figure 4D:
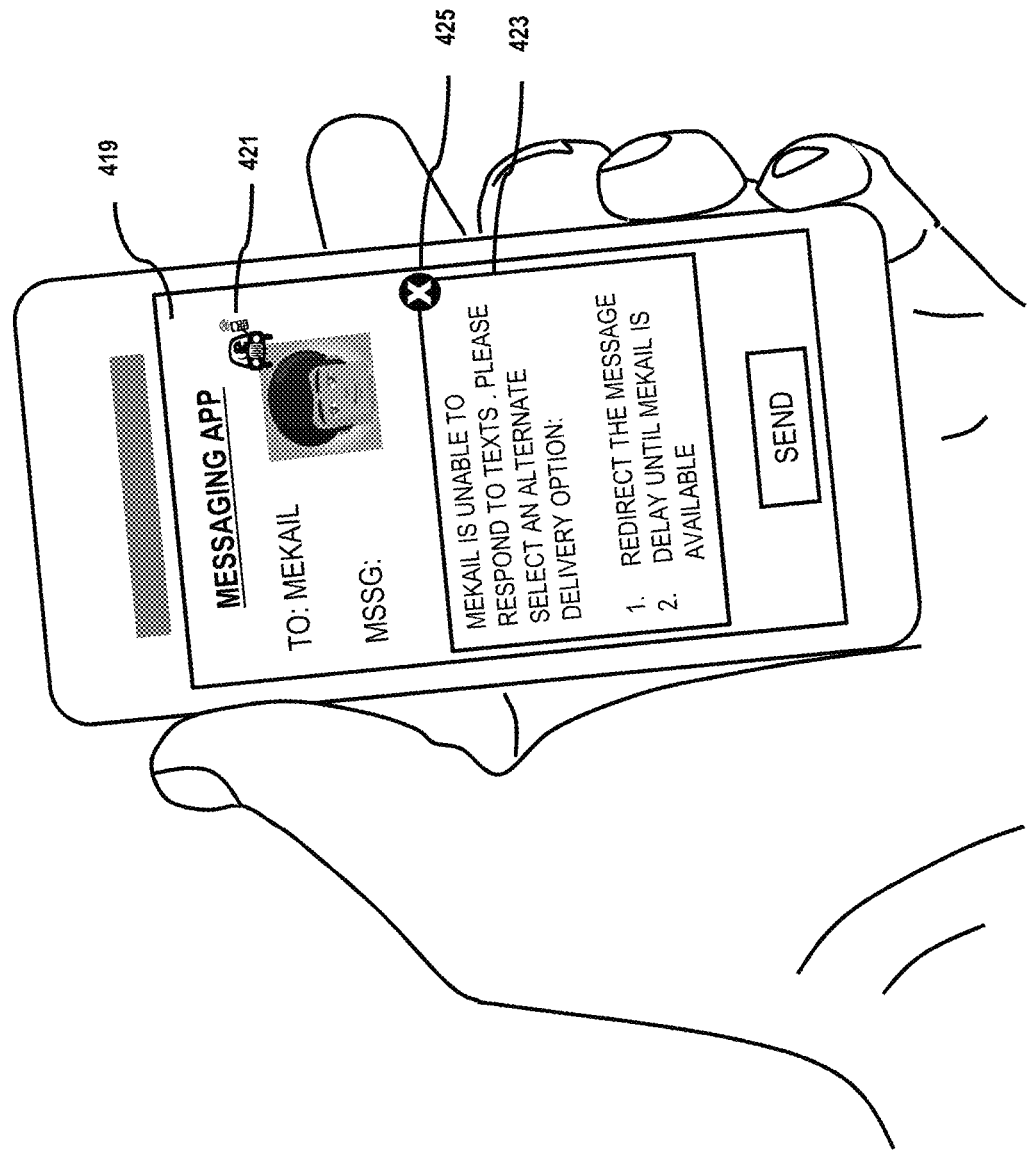

In FIG. 4D, Alijah launches a messaging application 419 at his device 418 to send a message. Under this scenario, the user initiates a request to send a message by selecting Mekail's contact information from a contact list. An icon 421 is presented along with the contact information for indicating Mekail's current driving status. Despite the driving status indicator 421, Alijah still selects to send a message to Mekail, which causes the activity detection platform 103 to render a delivery notification 423 to the interface 419. The notification 423 informs Alijah that Mekail is unable to receive texts due to his driving status (also based on the option by Mekail to block usage of his messaging application per checkbox 405). Also presented are the message delivery options available for selection, including the option to redirect the message or delay delivery until Mekail's driving activity is no more. It is noted that the options presented to Alijah correspond to the configuration settings established by Mekail with respect to his driving activity status.

Figure 4E:
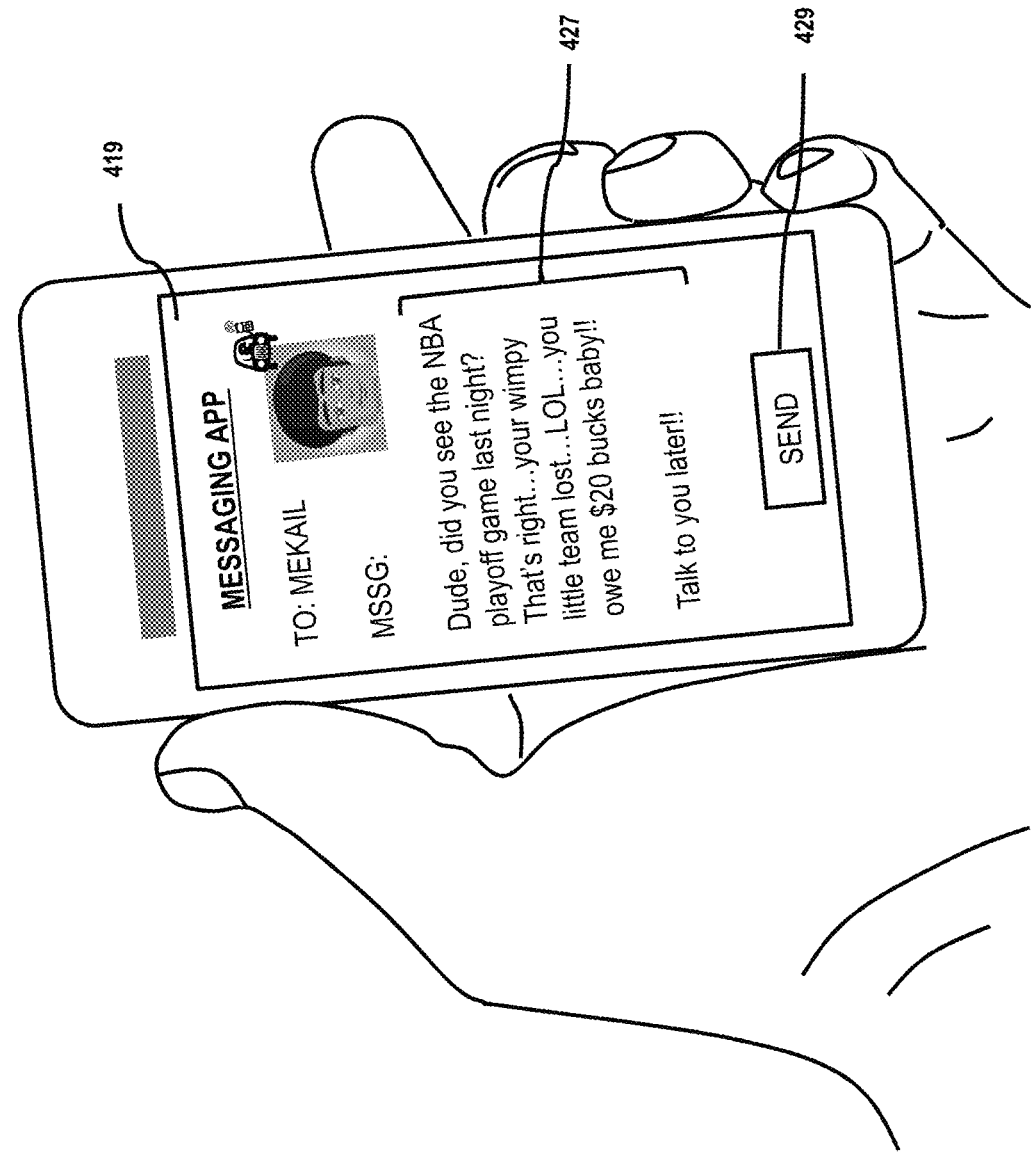
Figure 4F:
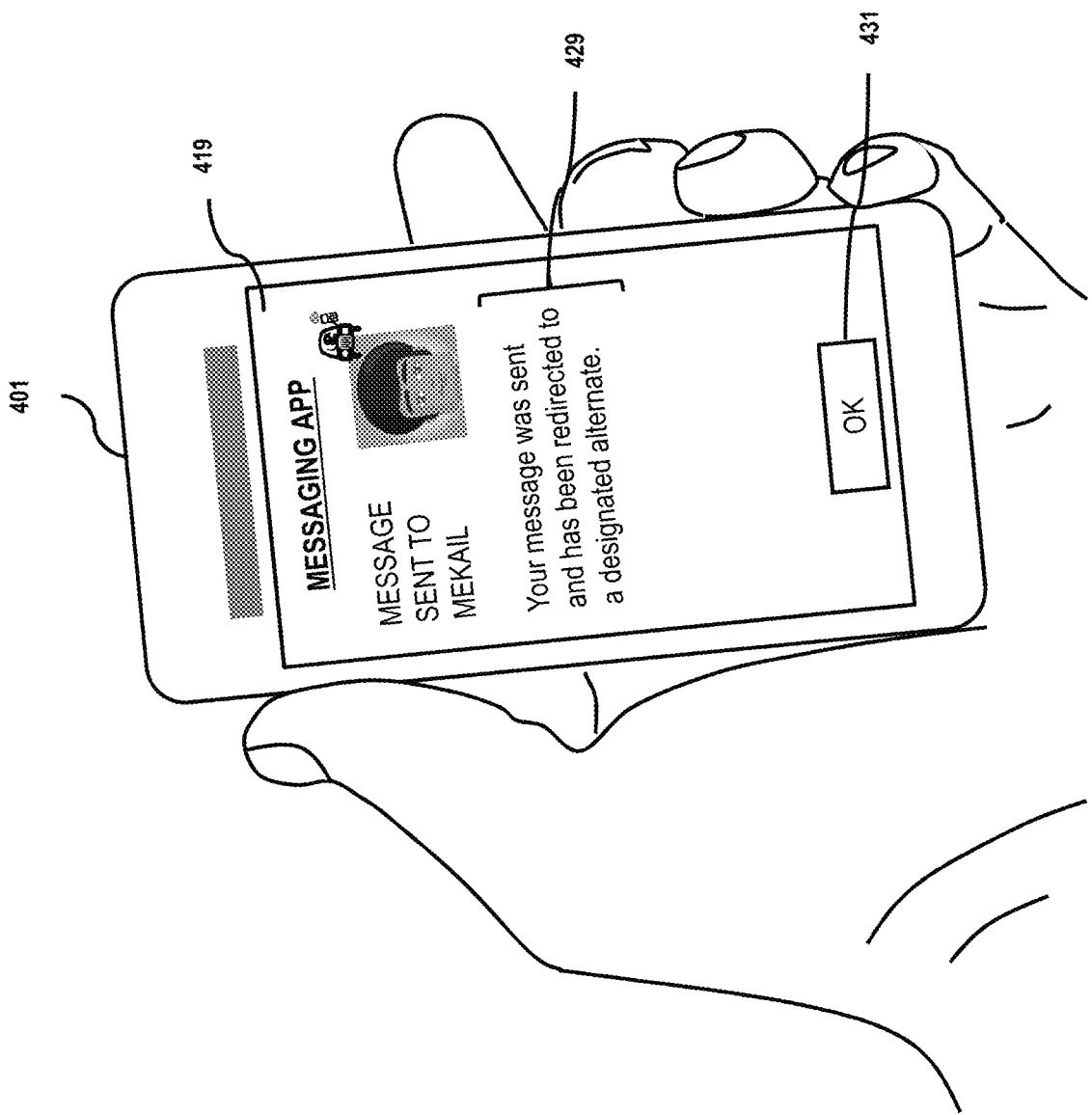

In this case, Alijah selects the redirect option and closes out the notification 423 by selecting the close button 425. He then proceeds to prepare a message 427 to be directed to Mekail, as shown in FIG. 4E. Once complete, he then selects the SEND action button 429, which initiates transmission of the message to a messaging service associated with Alijah's (the sender's) device 418. In addition, the activity detection platform 103 interfaces with the messaging service to initiate the redirection, thus causing the message intended for Alijah to be directed to the messaging service of his designated alternate Susan. As shown in FIG. 4F, a confirmation message 429 is presented to Alijah to inform him that the message was sent and redirected accordingly. Once complete, Alijah then clicks to OK action button 431.

It is noted in this example that the alternate user to whom the message from Alijah was redirected is not identified. This corresponds to the selection of a show/no show selection option 409b of FIG. 4B of the configuration interface 403 per Mekail's device 400. Selection of this button enables Mekail to identify or not identify the alternate user at the user's discretion. Having chosen the no show option, Susan's identification information is not presented to Alijah as the recipient of the message. If instead the show option was chosen however, the confirmation message 429 of FIG. 4F may have presented identifying information regarding Susan, such as her avatar, phone number, email address, etc. It is contemplated that Susan may also have priority over Mekail in establishing to show or not show her identification information.

Figure 4G:
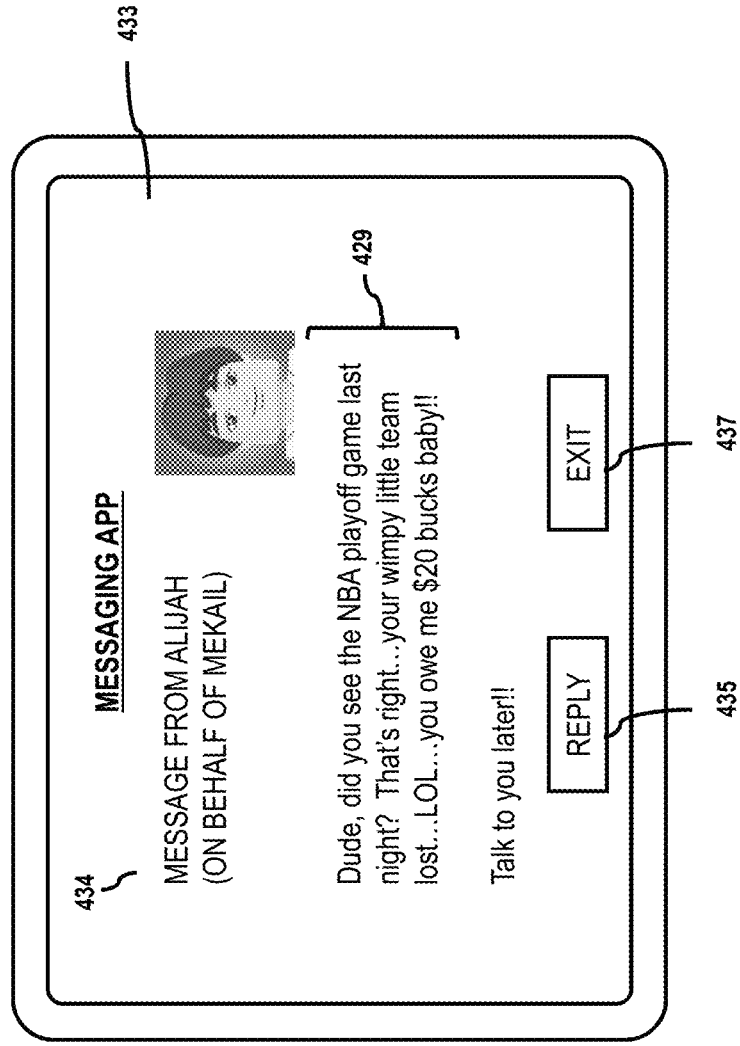

In FIG. 4G, as the alternate recipient, Susan receives and views the message 429 via the messaging application 433 of her device 432. As depicted herein, in addition to the message, the message receipt details 434 indicate that the message is intended for Mekail. Per this scenario, Susan is now able to verbally convey the message to Alijah as he continues to drive to their destination. She may also reply to Mekail on Alijah's behalf by selecting the REPLY action button 435 or exit the messaging application via selection of action button 437.

Figure 4H:
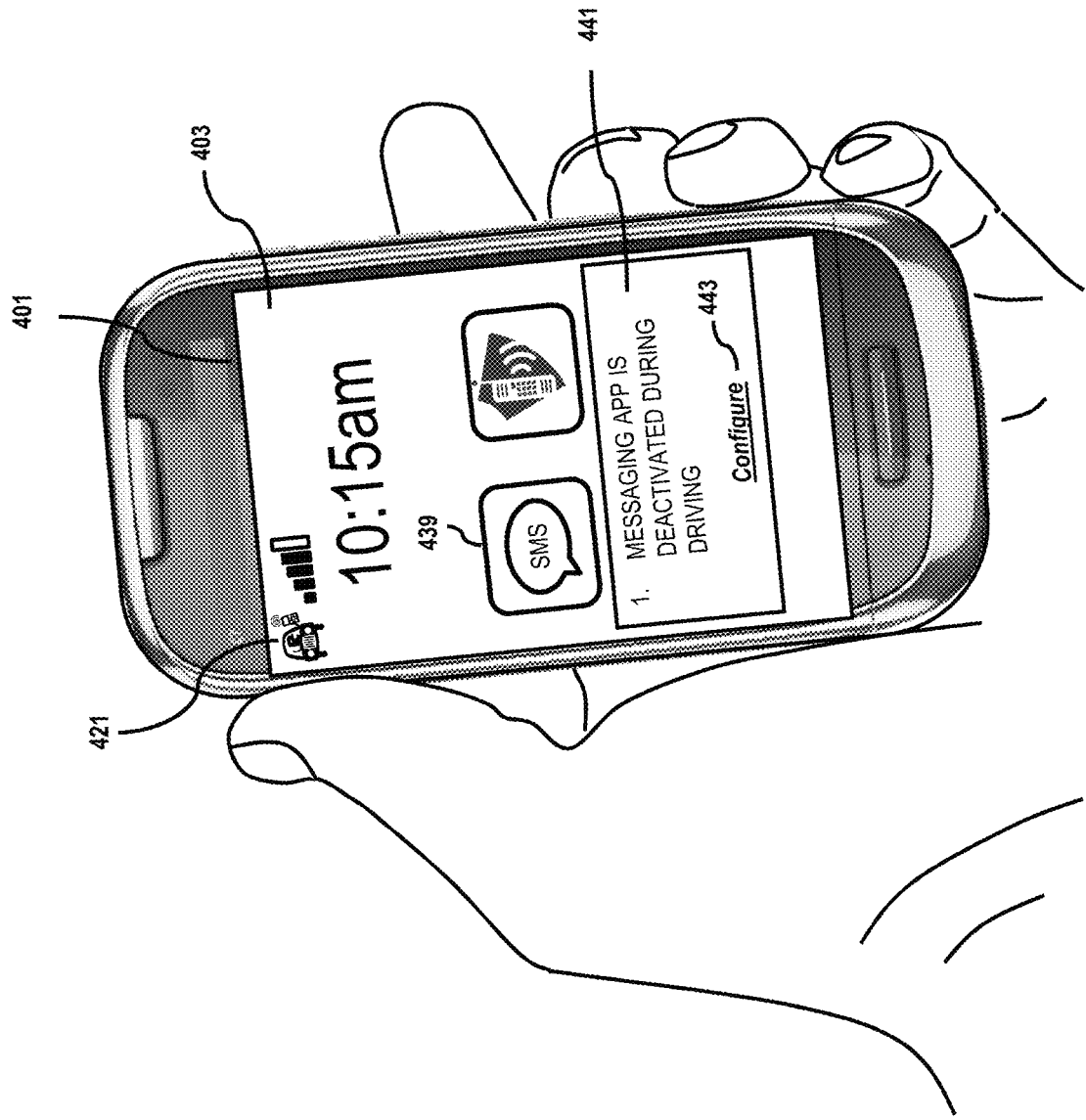

In FIG. 4H, Alijah decides to attempt to activate a messaging application of his device 400 to send a text message despite his current driving activity status (e.g., as indicated by icon 421). In this case, Alijah attempts to launch the application from his device desktop by selecting the corresponding launch shortcut 439 for the messaging application. In response, the platform 103 detects the current driving status of the user as well as the criteria/preference they established to disallow the activation of messaging applications during driving. It then initiates the presentment of a message 441 for indicating the current deactivation status. Optionally, a "Configure" link 443 may be presented for enabling the user to modify their criteria, i.e., immediately or once the driving status has changed.

Figure 4I:
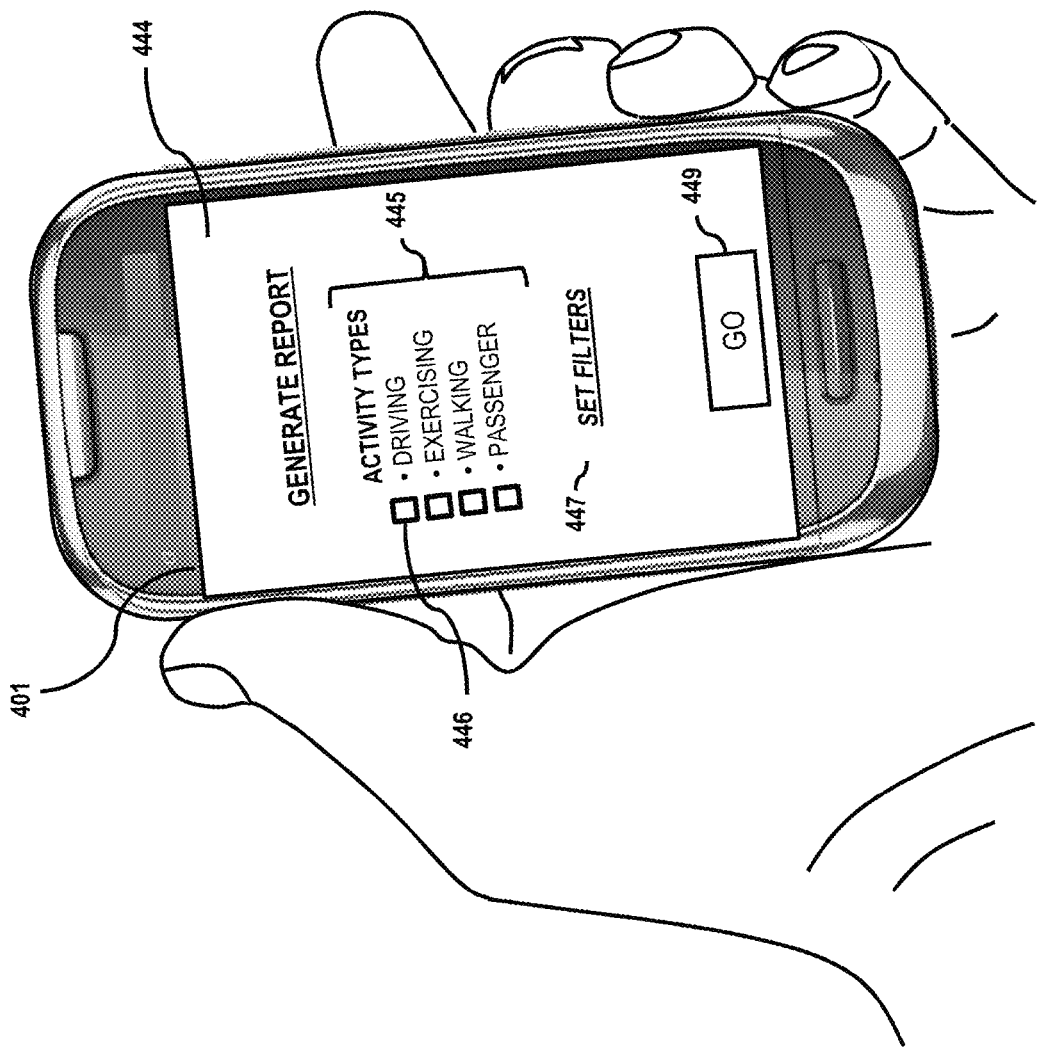

In FIG. 4I, a report generation interface 444 is rendered to the display 401 of the device 400. Per this interface 444, the user (Mekail) is able to generate reports regarding the activity status, historical use and/or messaging activities, etc. By way of example, the user may select from one or more checkboxes (e.g., checkbox 446) for specifying a particular activity type to base the report on. In addition, the user may select a "Set Filters" link 447, which enables the launch of another interface (not shown) for applying one or more filters for data gathering purposes. The filters may include a temporal filter for specifying a particular time/date to restrict an activity to, a geographic filter for specifying a particular location/region of occurrence of an activity, etc. In addition, the user may be presented with options to query the historical data for a number of messages received, which senders are the most popular for the user and/or during a given activity, etc. Once established, the user selects the GO action button 449 to generate (and present) the report. It is noted that the report may enable the user or others to whom the report is shared to identify behavioral and/or usage patterns of the user and those whom the user associates.

The processes described herein for delivering messages to a user based on their activity status may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
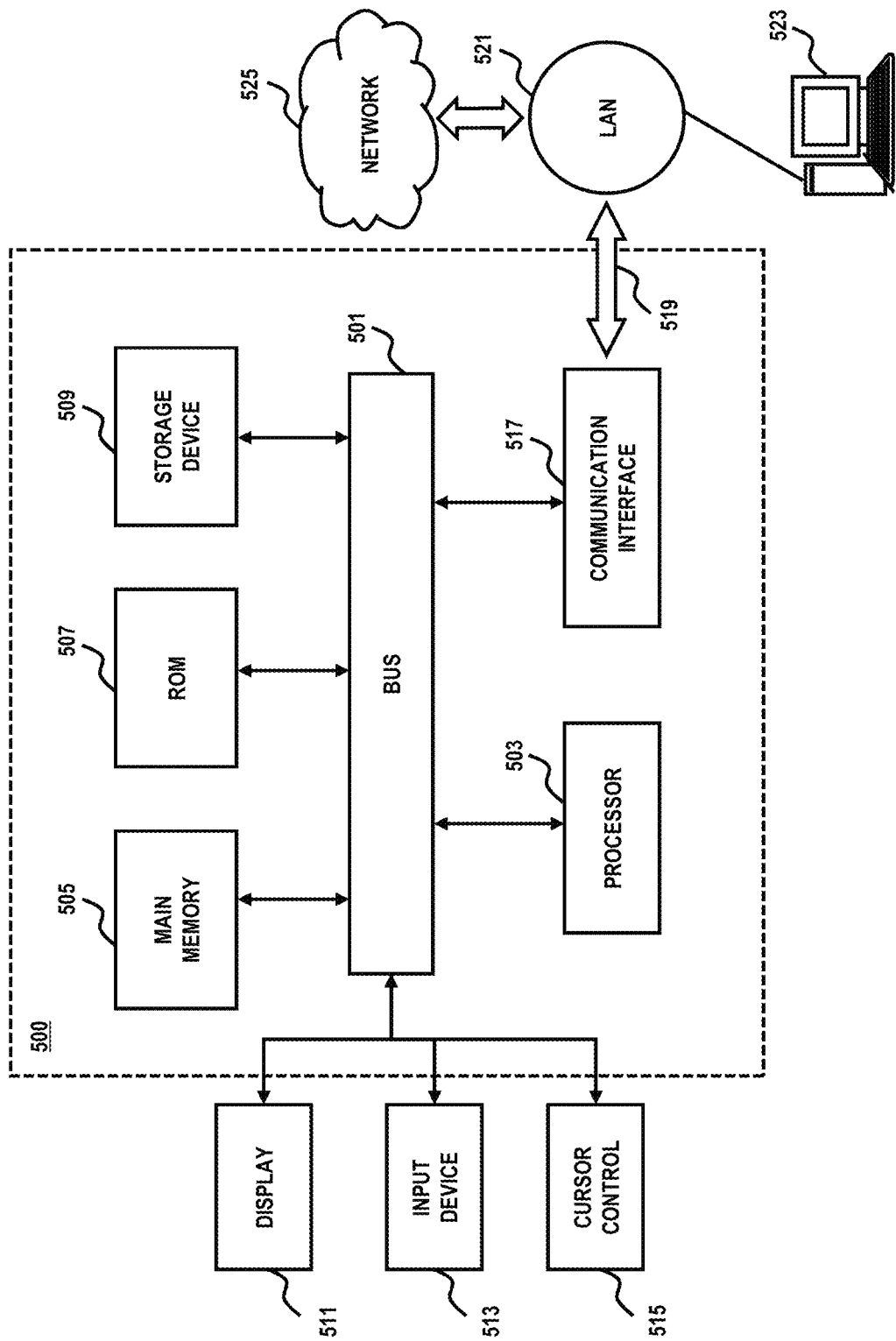
FIG. 5 is a diagram of a computer system that can be used to implement various exemplary embodiments.

FIG. 5 is a diagram of a computer system that can be used to implement various exemplary embodiments. The computer system 500 includes a bus 501 or other communication mechanism for communicating information and one or more processors (of which one is shown) 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for adjusting cursor movement on the display 511.

According to an embodiment of the invention, the processes described herein are performed by the computer system 500, in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multiprocessing arrangement may also be employed to execute the instructions contained in main memory 505. In alternative embodiments, hard-wired circuitry may be used in place of or in combination with software instructions to implement the embodiment of the invention. Thus, embodiments of the invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIGS. 4A-4I, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 6 illustrates a chip set or chip 600 upon which an embodiment of the invention may be implemented. Chip set 600 is programmed to deliver messages to a user based on their activity status as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of delivering messages to a user based on their activity status.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to deliver messages to a user based on their activity status. The memory 605 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a request to deliver a message from a sending device to a receiving device;
   detecting an activity status of a receiving user associated with the receiving device based on the request, the detecting of the activity status including:
      receiving, from the receiving device, an explicit indication, provided by the receiving user, of whether the receiving user is available to receive the message, and
      determining, based on the explicit indication, that the activity status of the receiving user is such that the receiving user is not available to receive the message; and
   based on detecting the activity status of the receiving user as being not able to receive the message:
      detecting that another receiving device, associated with another receiving user, is located within a proximity threshold of the receiving device;
      determining that the other receiving device is approved, by the receiving user, to receive the message;
      presenting, via a user interface of the sending device, contact information for the receiving user;
      presenting, via the user interface and in conjunction with the contact information for the receiving user device, a visual icon indicating the detected activity status of the receiving user;
      presenting, via the user interface, a plurality of delivery options for the message, the plurality of delivery options including:
         a first delivery option to send the message to the other receiving device, and
         a second delivery option to automatically send the message to the receiving device after the receiving user becomes available to receive the message;
         receiving a selection, via the user interface, of either the first delivery option or the second delivery option; and
      processing the message based on the selected delivery option, the processing including:
         when the first delivery option is selected, sending the message to the other device, and
         when the second delivery option is selected:
            forgoing sending the message to the receiving device until a determination is made that the receiving user is available to receive the message,
            determining, after forgoing sending the message, that the receiving user has become available to receive the message, and
            automatically sending the message to the receiving device after the determination is made that the receiving user is available to receive the message.

2. The method of claim 1, wherein the activity status includes a driving status, a busy status, a do not disturb status, a user defined status, or a combination thereof.

3. The method of claim 1, further comprising, when the second option is selected:
   intercepting a presentation of the message to the receiving device;
   detecting a change in the activity status of the receiving user; and
   initiating a presentation of the message to the receiving device based on the change and the at least one delivery option.

4. The method of claim 3, further comprising:
   configuring the detecting of the activity status, the presenting of the plurality of delivery options, the processing of the message, the sending of the message, or a combination thereof based on a contextual parameter.

5. The method of claim 4,
   wherein the contextual parameter includes a temporal parameter, a location parameter, an activity parameter, a user identifier, a device identifier, or a combination thereof.

6. The method of claim 1, further comprising:
transmitting, by the receiving device, an auto-reply message to the sending device,
wherein the auto-reply message indicates the activity status of the receiving user.

7. The method of claim 1, wherein the plurality of delivery options additionally includes converting the message to another medium for delivery.

8. The method of claim 1, further comprising:
presenting the activity status in a contact list at the sending device,
wherein the activity status is presented in the contact list visually, audibly, or a combination thereof.

9. The method of claim 1, wherein the activity status of the receiving user is further detected based on sensor data, contextual data, historical data, or a combination thereof.

10. The method of claim 1, wherein presenting the visual icon indicating the detected activity includes:
selecting a particular candidate icon, out of a plurality of candidate icons, that is associated with a type of the activity status, wherein other candidate icons, of the plurality of candidate icons, are associated with other types of activities, and
overlaying the selected particular candidate icon over the contact information of the receiving user.

11. An apparatus, comprising:
a non-transitory computer-readable medium storing a set of processor-executable instructions; and
a processor configured to execute the set of processor-executable instructions, wherein executing the set of processor-executable instructions causes the processor to:
receive a request to deliver a message from a sending device to a receiving device;
detect an activity status of a receiving user associated with the receiving device based on the request, by:
receiving, from the receiving device, an explicit indication, provided by the receiving user, of whether the receiving user is available to receive the message, and
determining, based on the explicit indication, that the activity status of the receiving user is such that the receiving user is not available to receive the message; and
based on detecting the activity status of the receiving user as being not available to receive the message:
detect that another receiving device, associated with another receiving user, is located within a proximity threshold of the receiving device;
determine that the other receiving device is approved, by the receiving user, to receive the message;
present, via user interface of the sending device, contact information for the receiving user;
present, via the user interface and in conjunction with the contact information for the receiving user device, a visual icon indicating the detected activity status of the receiving user;
present, via the user interface, a plurality of delivery options for the message, the plurality of delivery options including:
a first delivery option to send the message to the other receiving device, and
a second delivery option to automatically send the message to the receiving device after the receiving user becomes available to receive the message;
receive a selection, via the user interface, of either the first delivery option or the second delivery option; and
process the message based on the selected delivery option, the processing including:
when the first option is selected, sending the message to the other device, and
when the second delivery option is selected:
forgoing sending the message to the receiving device until a determination is made that the receiving user is available to receive the message,
determining, after forgoing sending the message, that the receiving user has become available to receive the message, and
automatically sending the message to the receiving device after the determination is made that the receiving user is available to receive the message.

12. The apparatus of claim 11, wherein the activity status includes a driving status, a busy status, a do not disturb status, a user defined status, or a combination thereof.

13. The apparatus of claim 11, wherein executing the set of processor-executable instructions further causes the processor to, when the second option is selected:
intercept a presentation of the message to the receiving user;
detect a change in the activity status of the receiving user; and
initiate a presentation of the message to the receiving user based on the change and the at least one delivery option.

14. The apparatus of claim 13, wherein executing the set of processor-executable instructions further causes the processor to:
configure the detecting of the activity status, the presenting of the plurality of delivery options, the processing of the message, the sending of the message, or a combination thereof based on a contextual parameter.

15. The apparatus of claim 14, wherein the contextual parameter includes a temporal parameter, a location parameter, an activity parameter, a user identifier, a device identifier, or a combination thereof.

16. A non-transitory computer readable medium storing a plurality of processor-executable instructions, wherein executing the processor-executable instructions causes one or more processors to:
receive a request to deliver a message from a sending device to a receiving device;
detect an activity status of a receiving user associated with the receiving device based on the request, by:
receiving, from the receiving device, an explicit indication, provided by the receiving user, of whether the receiving user is available to receive the message, and
determining, based on the explicit indication, that; the activity status of the receiving user is such that the receiving user is not available to receive the message; and
based on detecting the activity status of the receiving user as being not able to receive the message:
detect that another receiving device, associated with another receiving user, is located within a proximity threshold of the receiving device;
determine that the other receiving device is approved, by the receiving user, to receive the message;

present, via user interface of the sending device, contact information for the receiving user;
present, via the user interface and in conjunction with the contact information for the receiving user device, a visual icon indicating the detected activity status of the receiving user;
present, via the user interface, a plurality of delivery options for the message, the plurality of delivery options including:
a first delivery option to send the message to the other receiving device, and
a second delivery option to automatically send the message to the receiving device after the receiving user becomes available to receive the message;
receive a selection, via the user interface, of either the first delivery option or the second delivery option; and
process the message based on the selected delivery option, the processing including:
when the first delivery option is selected, sending the message to the other device, and
when the second delivery option is selected:
forgoing sending the message to the receiving device until a determination is made that the receiving user is available to receive the message,
determining, after forgoing sending the message, that the receiving user has become available to receive the message, and
automatically sending the message to the receiving device after the determination is made that the receiving user is available to receive the message.

17. The non-transitory computer readable medium of claim 16, wherein the activity status includes a driving status, a busy status, a do not disturb status, a user defined status, or a combination thereof.

18. The non-transitory computer readable medium of claim 16, wherein execution of the processor-executable instructions further causes the one or more processors to:
intercept a presentation of the message to the receiving device;
detect a change in the activity status of the receiving user; and
initiate a presentation of the message to the receiving device based on the change and the at least one delivery option.

19. The method of claim 1, wherein the indication is received subsequent to detecting an event associated with the receiving device, indicating a possibility that the receiving user is unavailable for receiving the message.

20. The method of claim 19, further comprising:
in response to detecting the event,
prompting the receiving user, via the receiving device, for the explicit indication of whether the receiving user is available to receive the message.

* * * * *